(12) United States Patent
Taguchi (10) Patent No.: US 6,851,573 B2
(45) Date of Patent: Feb. 8, 2005

(54) MUDDLER CARRYING-OUT DEVICE FOR BEVERAGE POURED INTO CUP

(75) Inventor: Masayuki Taguchi, Isesaki (JP)

(73) Assignee: Sanden Corp., Gunma (JP)

( * ) Notice: Subject to any disclaimer, the term of this patent is extended or adjusted under 35 U.S.C. 154(b) by 104 days.

(21) Appl. No.: 10/422,722

(22) Filed: Apr. 25, 2003

(65) Prior Publication Data

US 2003/0201279 A1 Oct. 30, 2003

(30) Foreign Application Priority Data

Apr. 30, 2002 (JP) ........................................ 2002-128809

(51) Int. Cl.[7] .............................................. B65G 59/00
(52) U.S. Cl. ...................................... 221/199; 221/277
(58) Field of Search ........................... 221/93, 96, 123, 221/124, 199, 232, 237, 277, 289

(56) References Cited

U.S. PATENT DOCUMENTS

2003/0201279 A1 * 10/2003 Taguchi ..................... 221/277

FOREIGN PATENT DOCUMENTS

JP          11-302126          5/2001

* cited by examiner

Primary Examiner—Kenneth Noland
(74) Attorney, Agent, or Firm—Banner & Witcoff, Ltd.

(57) ABSTRACT

A muddler carrying-out device includes a muddler storing part for storing a plurality of stacked muddlers, and a muddler carrying-out part for carrying out the lowest muddler of the plurality of muddlers stored in the muddler storing part to a muddler takeout port. Further, the muddler carrying-out part operates below the second lowest muddler, and a distance of carrying out the muddler in the muddler carrying-out part is set at a distance of protruding a part of the lowest muddler from the muddler takeout port. When the lowest muddler is left without being pulled out at the time of carrying out the muddler, the lowest muddler moves over a distance of carrying out the muddler and the second lowest muddler is supported by the lowest muddler. With this arrangement, even when the muddler carrying-out part is driven thereafter, the carrying-out force of the muddler carrying-out part is not applied to the lowest muddler and the carrying-out force of the muddler carrying-out part is not applied to the second lowest muddler.

10 Claims, 15 Drawing Sheets

SIDE OF ARTICLE TAKEOUT PORT

FIG. 18B

MUDDLER CARRYING-OUT DEVICE FOR BEVERAGE POURED INTO CUP

BACKGROUND OF THE INVENTION

1. Field of the Invention

The present invention relates to a muddler carrying-out device installed in a cup type beverage vending machine and so on and specifically concerns a carrying-out device for carrying out a muddler used for stirring beverage poured into a cup.

2. Description of the Related Art

Coffee prepared by a cup type beverage vending machine has been conventionally sold in the following process. First, a cup carrying-out device is driven to drop a cup. The cup is held by a cup holder mechanism which is on standby at a cup receiving position. Subsequently, coffee liquid, sugar, and milk are poured into the cup, so that beverage of coffee is prepared. After a while, the cup holder mechanism is driven and the cup is carried out to a cup selling position. Thereafter, a buyer takes out the cup from the cup selling position. Thus, the selling process of coffee is completed.

Further, a muddler carrying-out device has been proposed which is installed so as to adjoin to such a vending machine. The muddler carrying-out device carries out muddlers one by one every time beverage is sold. A buyer uses the muddler to stir coffee poured into a cup.

However, unnecessary muddlers are carried to buyers not requesting muddlers. Hence, muddlers have been frequently thrown into trash cans without being used, resulting in a waste of resources.

SUMMARY OF THE INVENTION

In view of the above conventional problem, the present invention has as its object the provision of a muddler carrying-out device whereby only a person requesting a muddler can arbitrarily obtain a muddler and thus resource saving is achieved.

A muddler carrying-out device according to a first invention comprises a muddler storing part for storing a plurality of stacked muddlers, and a muddler carrying-out part for carrying out the lowest muddler of the plurality of muddlers stored in the muddler storing part to a muddler takeout port, wherein a distance of carrying out the muddler in the muddler carrying-out part is set at a distance of protruding a part of the lowest muddler from the muddler takeout port.

According to the present invention, when the lowest muddler is carried out, the muddler partially protrudes from the muddler takeout port.

Hence, when a person requiring a muddler pulls out a muddler from the muddler takeout port, the second lowest muddler, which has been stacked on the lowest muddler until then, serves as the lowest muddler and stands ready for the subsequent carrying-out operation.

On the other hand, when the lowest muddler is left without being used, the lowest muddler moves over a distance of carrying out the muddler and the second lowest muddler is supported by the lowest muddler. With this arrangement, even when the muddler carrying-out part is driven thereafter, the carrying-out force of the muddler carrying-out part is not applied to the lowest muddler or the carrying-out force of the muddler carrying-out part is not applied to the second lowest muddler.

The above-described object, other objects, features, and advantages of the present invention will be apparent from the following description and the accompanying drawings.

DESCRIPTION OF THE PREFERRED EMBODIMENTS

FIGS. 1 to 13 show one embodiment of a muddler carrying-out device according to the present invention.

The muddler carrying-out device of the present embodiment is installed in a small cup type beverage vending machine. Referring to the front view of FIG. 1, the, cup type coffee vending machine will be discussed below. A coin slot 11, an article selection switch 12, a sugar increasing switch 13, a cream increasing switch 14 are provided on a front door 1 of the vending machine. Moreover, after a coin is dropped into the coin slot 11, when the switches 12 to 14 are selected, various kinds of coffee are prepared according to the selections. Then, a cup is carried to the inside of an article takeout door 15 and coffee is poured into the cup. Subsequently, a buyer opens the article takeout door 15 to take out the cup. In this way, the sale of coffee is completed.

Figure 1:
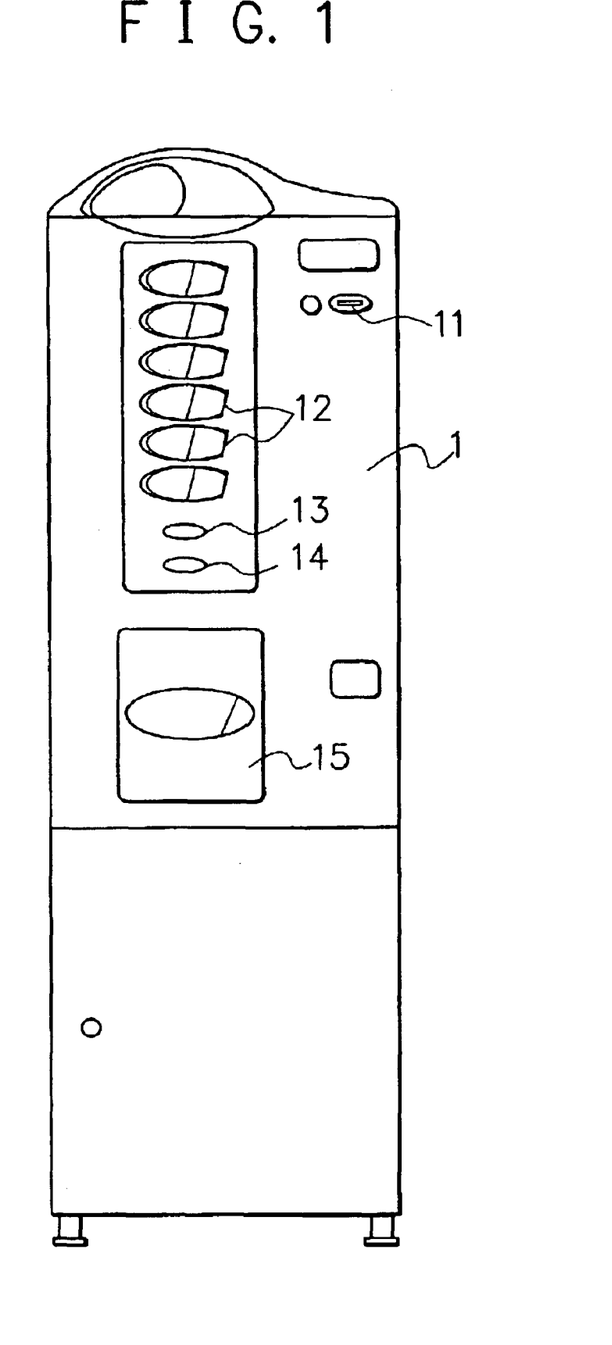
FIG. 1 is a front view showing a cup type beverage vending machine.
Figure 2:
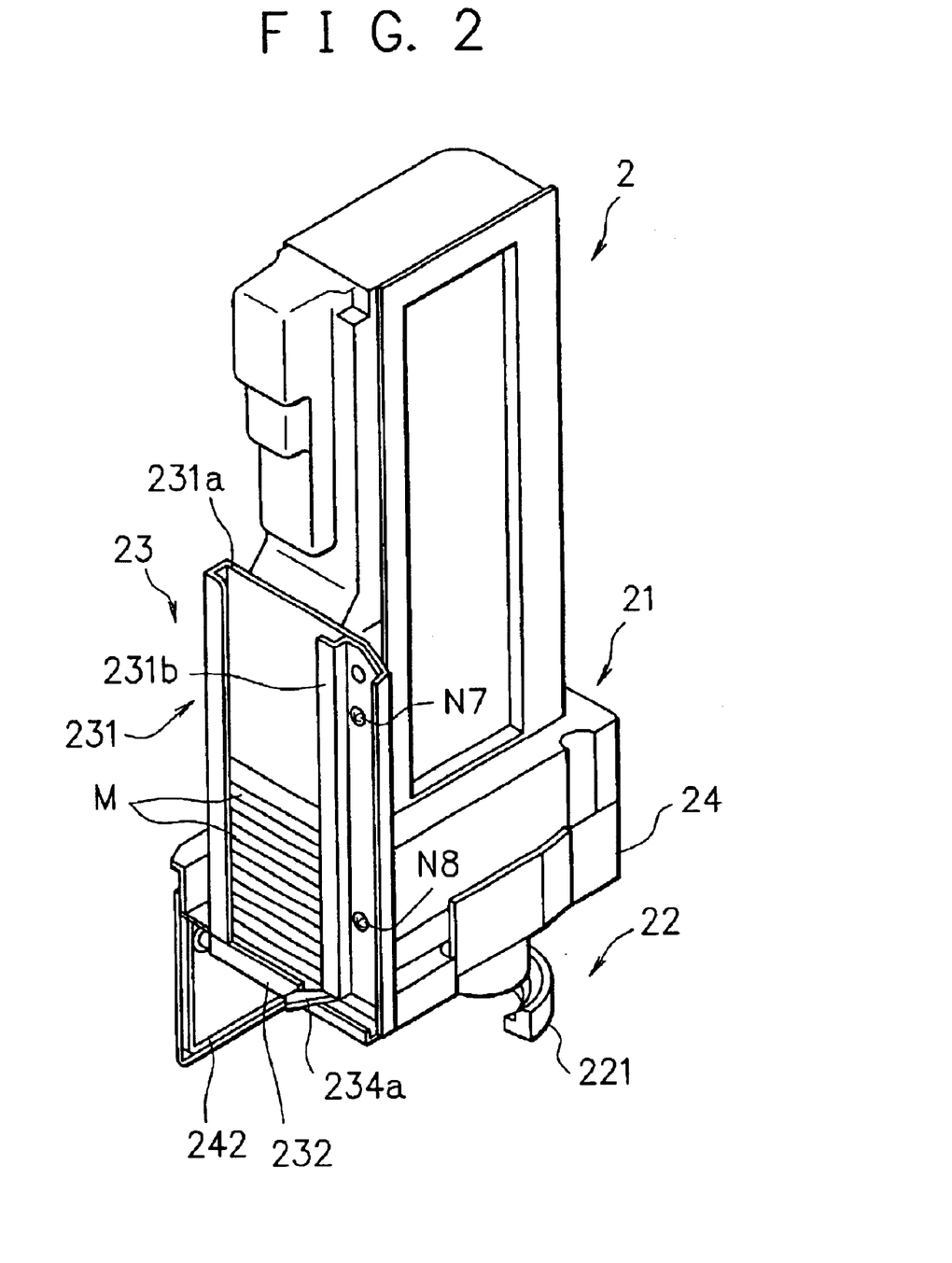
FIG. 2 is a perspective view showing an integral-type carrying-out unit of a cup carrying-out device, a cup holder mechanism, and a muddler carrying-out device.

In the small vending machine configured thus, the muddler carrying-out device is installed in a carrying-out unit 2 of FIG. 2. The carrying-out unit 2 is constituted by integrally combining a cup carrying-out device 21, a cup holder mechanism 22, and a muddler carrying-out device 23. Referring to FIG. 2, the devices 21, 22, and 23 will be discussed below. The cup carrying-out device 21 storing a number of cups (not shown) is vertically extended. Further, the cup holder mechanism 22 for holding a carried cup is installed below the cup carrying-out device 21. Furthermore, the muddler carrying-out device 23 for carrying out muddlers M is installed on a side of the cup carrying-out device 21.

Figure 3:
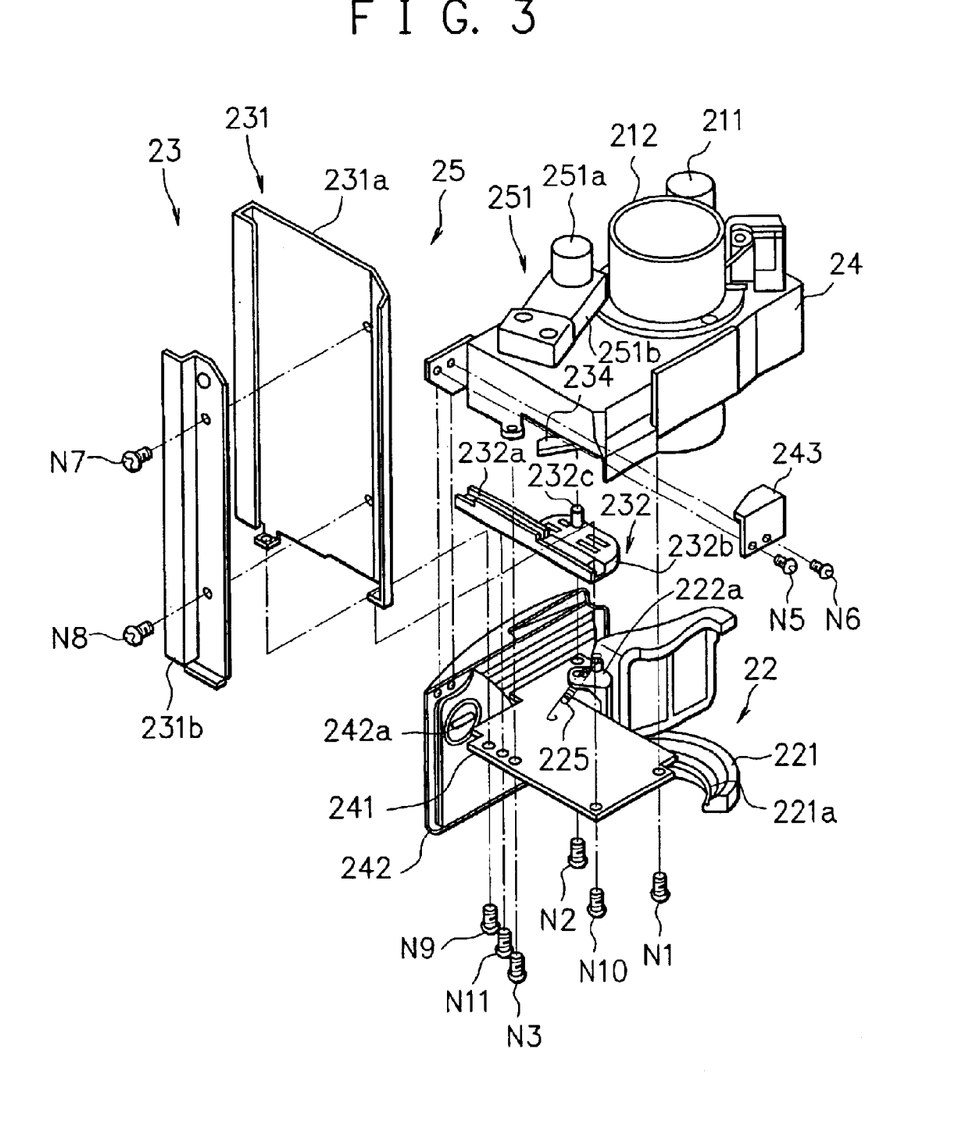
FIG. 3 is an exploded perspective view showing the cup carrying-out device, the cup holder mechanism, and the muddler carrying-out device.

As shown in FIG. 3, the driving systems of the devices 21, 22, and 23 are installed on a chassis 24. The chassis 24 is formed as a flat and square shape. Moreover, a first driving motor 211 of the cup carrying-out device 21 and a second driving motor 251 are installed on the upper part of the chassis 24. The second driving motor 251 drives both of the cup holder mechanism 22 and the muddler carrying-out device 23.

The first driving motor 211 drives a well-known cup separating device 212, which is placed near the first driving motor 211. The cup separating device 212 separates the lowest one from the cups C (not shown) stacked inside the device 212 and drops the lowest one to a lower position (a cup receiving position).

Figure 4:
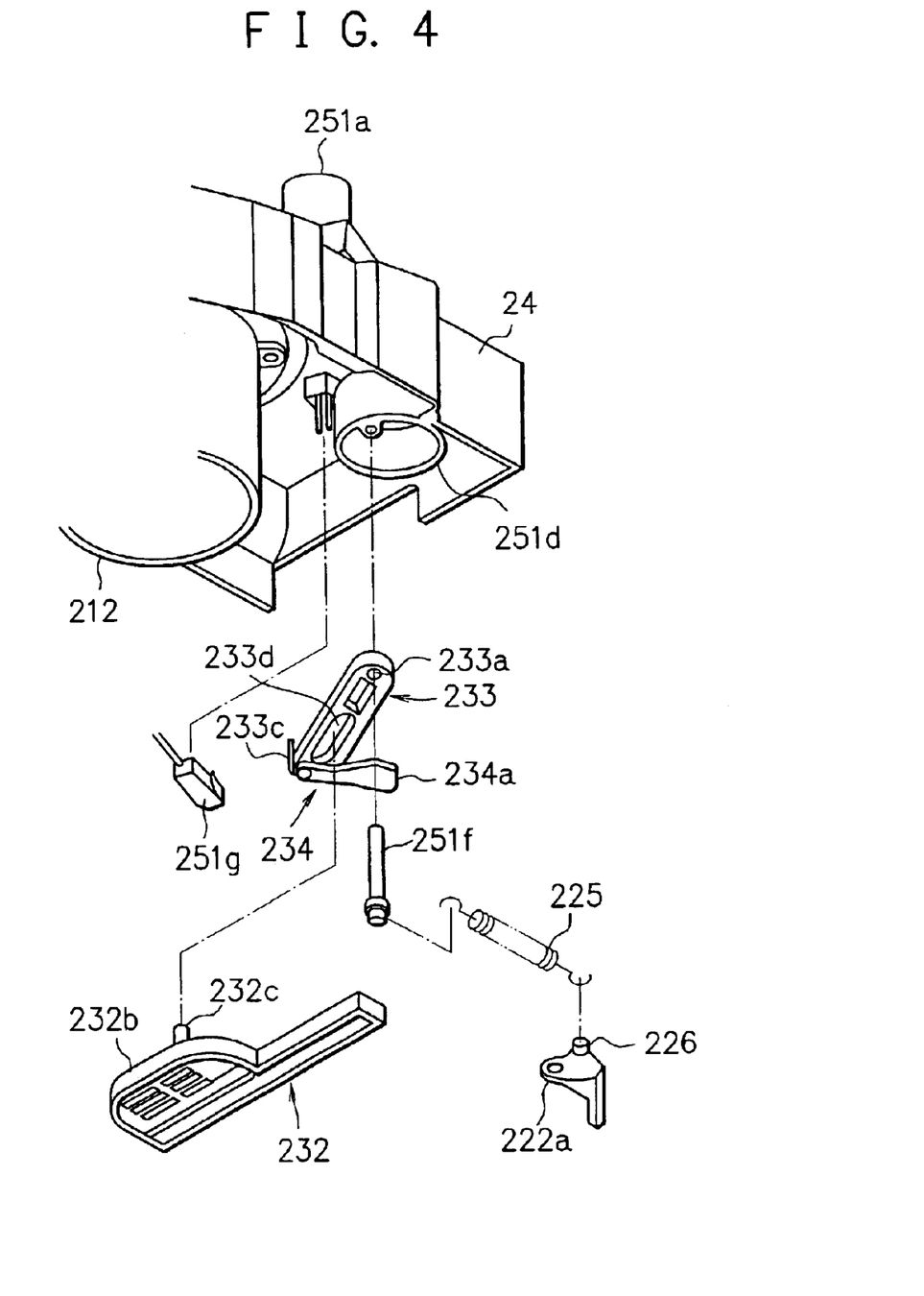
FIG. 4 is an exploded perspective view showing a power transmitting member of the cup holder mechanism and the muddler carrying-out device.
Figure 5:
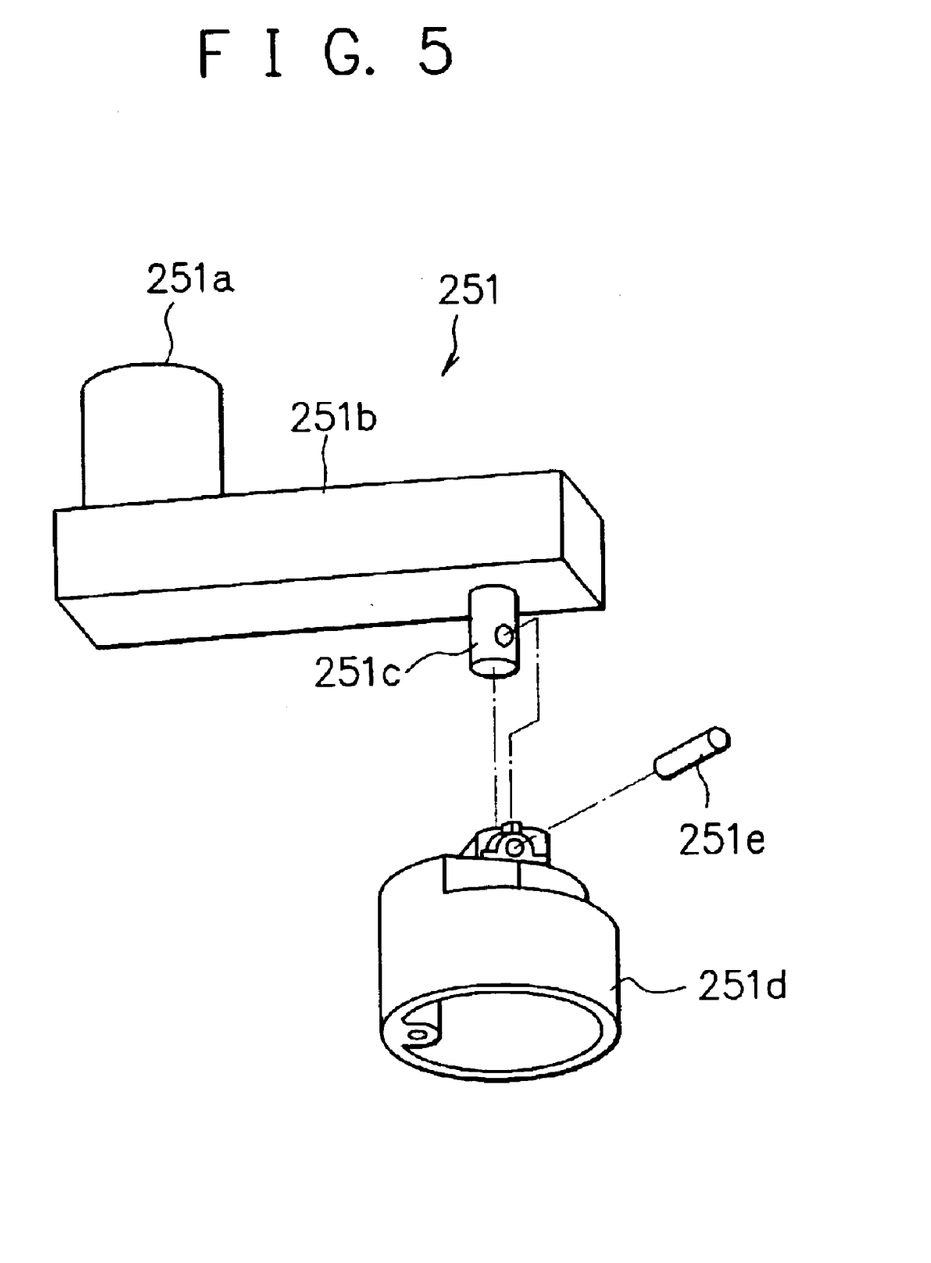
FIG. 5 is an exploded perspective view showing a rotating drum.

As shown in FIG. 5, the second driving motor 251 has a motor 251a and a gear box 251b for storing a reduction gear of the motor 251a. Further, an output shaft 251c protrudes downward from the gear box 251b. As shown in FIG. 5, the output shaft 251c having a cylindrical rotating drum 251d connected via a connecting pin 251e, and the rotating drum 251d is rotated. Further, as shown in FIG. 4, an output pin 251f is connected to of the lower peripheral edge of the rotating drum 251d, so that the output pin 251f is rotated in circular track by driving the motor 251a. Then, the rotational motion of the output pin 251f is transferred to the cup holder mechanism 22 and the muddler carrying-out device 23. A micro switch 251g for detecting a rotation angle is placed near the rotating drum 251d.

Figure 6:
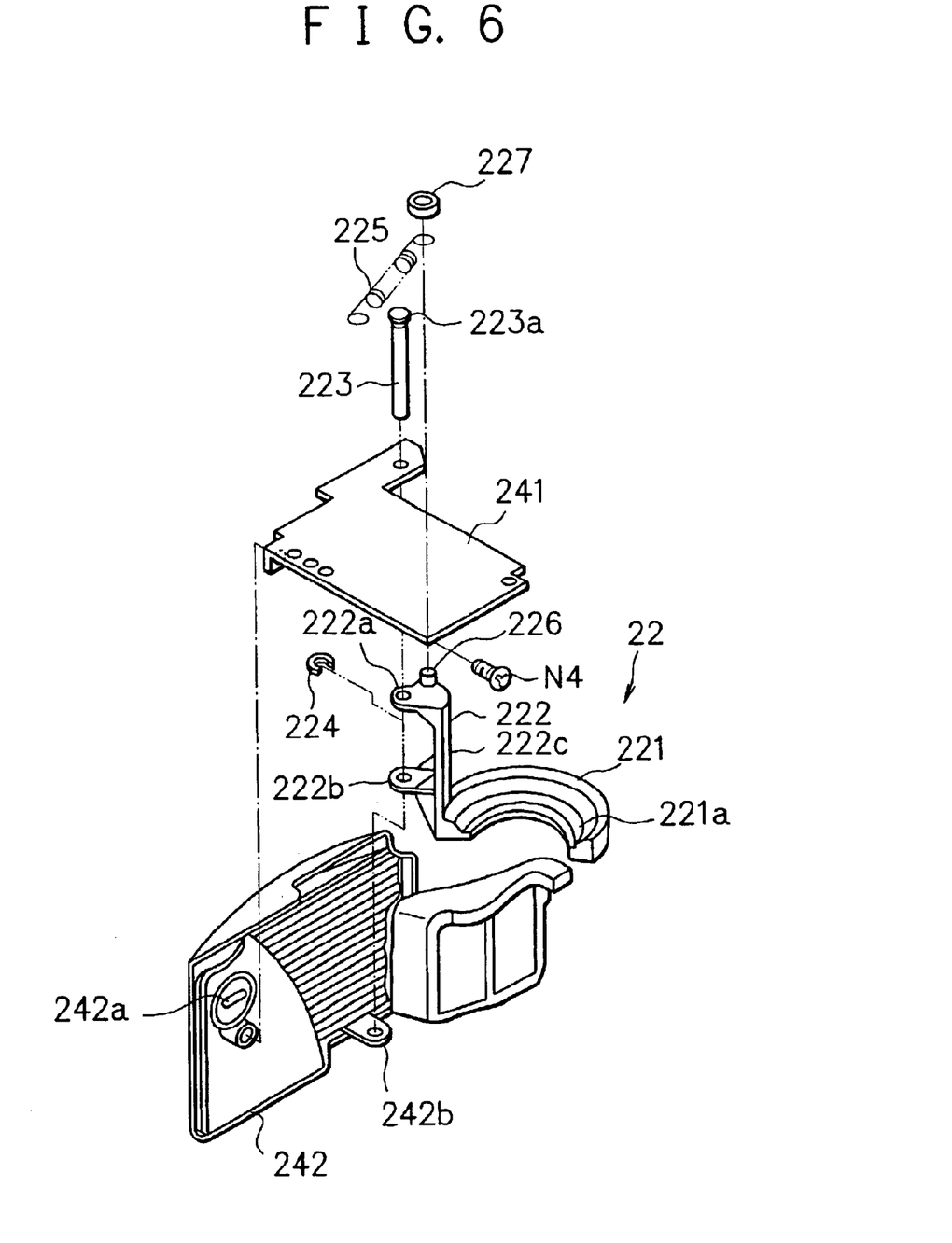
FIG. 6 is an exploded perspective view showing the cup holder mechanism.
Figure 7:
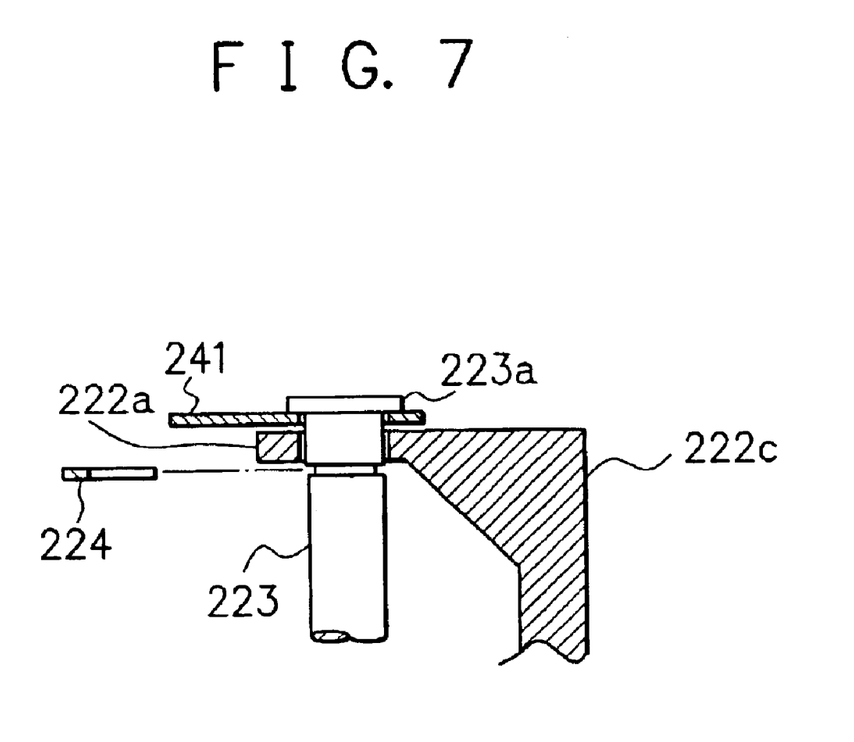
FIG. 7 is a sectional view showing a state of installing the rotary shaft of the cup holder mechanism.
Figure 8:
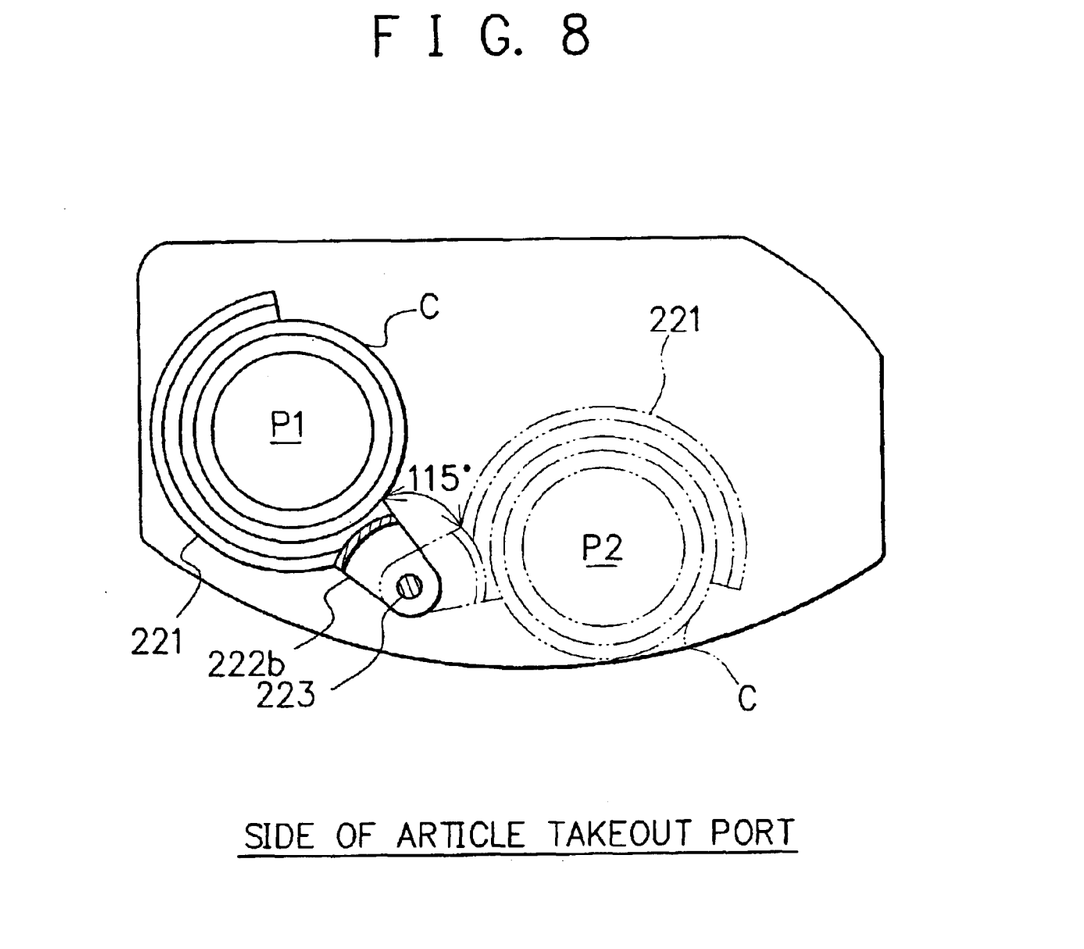
FIG. 8 is a plan view showing an operation of a holder.
Figure 9:
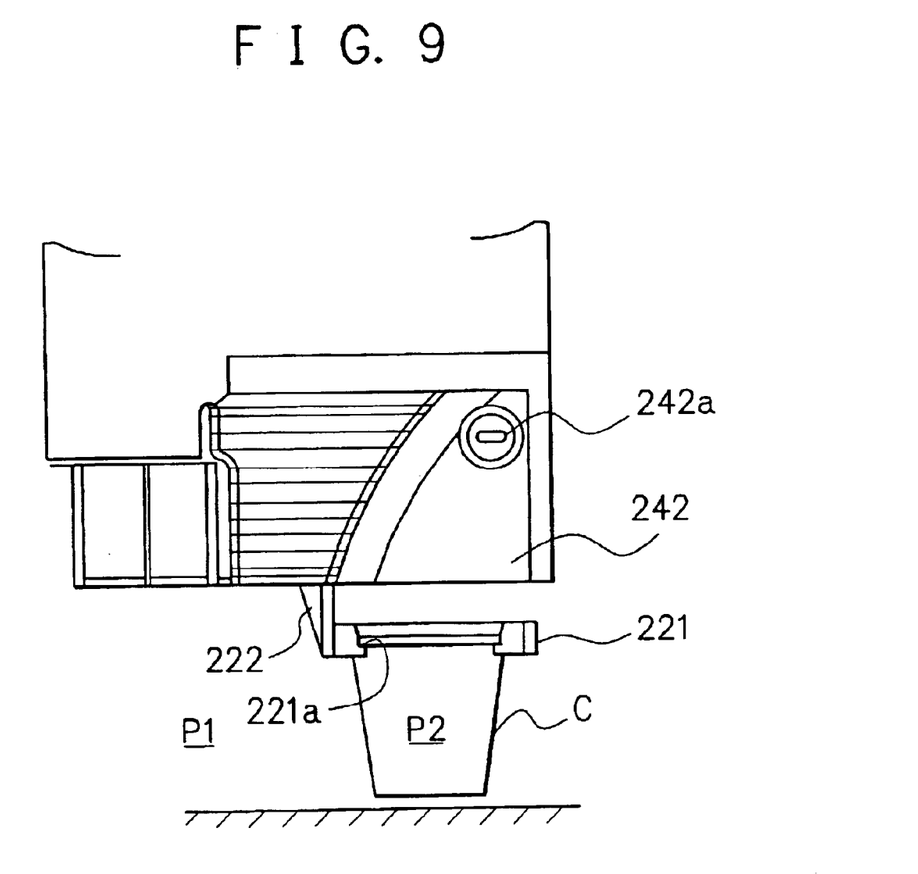
FIG. 9 is a front view showing that a cup is moved to a cup selling position.

Referring to FIGS. 3 to 9, the following will discuss the configuration of the cup holder mechanism 22 driven by the second driving motor 251. The cup holder mechanism 22 has a ring-shaped holder 221 which is partially notched. The holder 221 receives the cup C dropping from the cup carrying-out device 21. As shown in FIG. 9, the upper end of the cup C is held by a lower inner edge 221a provided on the inner peripheral surface of the holder 221. Moreover, as shown in FIG. 6, a connecting plate 222 having shaft receiving plates 222a and 222b above and below is formed on the outer surface of the holder 221. A shaft pin 223 passes through the shaft receiving plates 222a and 222b. While the upper part of the shaft pin 223 penetrates a chassis bottom plate 241 for closing the bottom of the chassis 24, the lower part of the shaft pin 223 penetrates the shaft receiving plate 242b which protrudes from a chassis bracket 242. With this arrangement, the holder 221 can freely rotate. Further, as shown in FIG. 7, the chassis bottom plate 241 and the upper shaft receiving plate 222a are interposed between a top flange 223a of the shaft pin 223 and an E ring 224. Thus, the holder 221 is fixed while being suspended from the chassis bottom plate 241. Further, as shown in FIG. 3, the chassis bottom plate 241 is fastened on the periphery of the chassis 24 with screws N1, N2, and N3. As shown in FIG. 6, the chassis bottom plate 241 is similarly fastened on the chassis bracket 242 with a screw N4. Furthermore, as shown in FIG. 3, the chassis 24 is fastened on the chassis bracket 242 via a fixed bracket 243 (screws N5 and N6).

In this way, the holder 221 capable of freely rotating is connected to the output pin 251f via a power transmitting member, that is, a link member 225 formed by a coil spring in the present embodiment. Namely, as shown in FIGS. 4 and 6, the upper surface of the upper shaft receiving plate 222a has a connecting protrusion 226 separated from the shaft pin 223. The connecting protrusion 226 is connected to one end of the link member 225 by capping a push nut 227. Further, the other end of the link member 225 is connected to the lower end of the output pin 251f. Besides, the link member 225 has strong spring force and power transmitted from the output pin 251f is transmitted to the holder 221 without being degraded. Thus, the rotating drum 251d is rotated. When the output pin 251f is rotated, as shown in FIG. 8, the holder 221 performs reciprocating rotary movement (a rotation angle of 115°) between a cup receiving position P1 and a cup selling position P2. Besides, the reciprocating movement of the holder 221 is performed on the cup selling position P2→the cup receiving position P1→the cup selling position P2.

Subsequently, referring to FIGS. 2 to 4 and FIGS. 10 to 13, the configuration of the muddler carrying-out device 23 will be discussed below. The muddler carrying-out device 23 is constituted by a muddler storing part 231 which stacks and stores muddlers M, a muddler guiding part 232 for guiding the lowest muddler M1 of the muddlers M stored in the muddler storing part 231, a rocking link 233 connected to the output pin 251f of the second driving motor 251, and a muddler carrying-out element 234 which is rocked to and from by rocking the rocking link 233. The muddler guiding part 232, the rocking link 233, and the muddler carrying-out element 234 constitute a muddler carrying-out part 235 for carrying the lowest muddler M1.

Referring to FIGS. 2 and 3, the configuration of the muddler storing part 231 will be described below. As shown in FIG. 2, the muddler storing part 231 is extended vertically on a side of the carrying-out unit 2. Further, the muddler storing part 231 is constituted by a muddler storing plate 231a and a muddler holding plate 231b. The muddler storing plate 231a has the front bent like the letter "Π" to hold the front side of the muddlers M, and the muddler holding plate 231b is bent like steps to hold the back side of the muddlers M. Thus, as shown in FIG. 2, a number of muddlers M are stacked in the muddler storing plate 231a. The muddler holding plate 231b is fastened on a surface of the muddler storing plate 231a with a screw N7 and a screw N8. Further, the bottom of the muddler storing plate 231a has the front side fastened with a screw N9 and the back side fastened with a screw N10 on the chassis bottom plate 241. Hence, the muddler storing part 231 is entirely fixed on the side of the carrying-out unit 2.

Figure 11A:
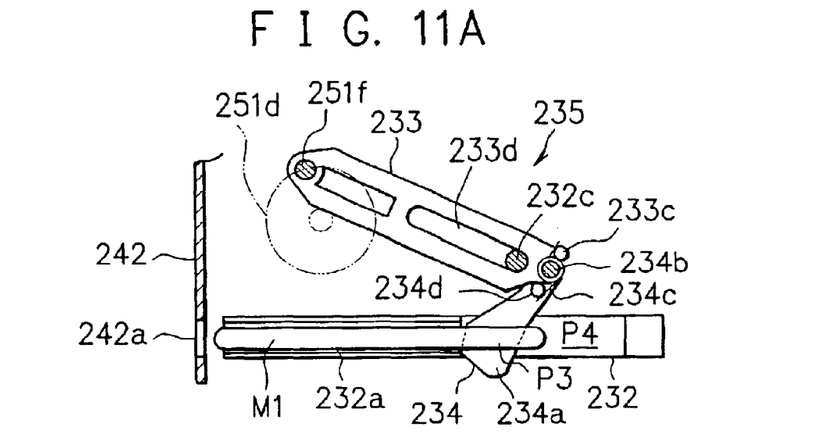
FIG. 11A is a plan sectional view showing the standby state of the muddler carrying-out device.
Figure 11B:
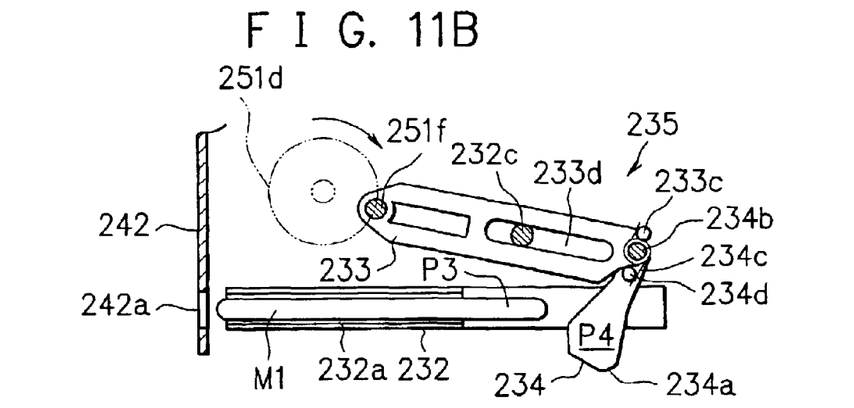
FIG. 11B is a plan sectional view showing that a muddler carrying-out element is moved to a standby position.
Figure 11C:
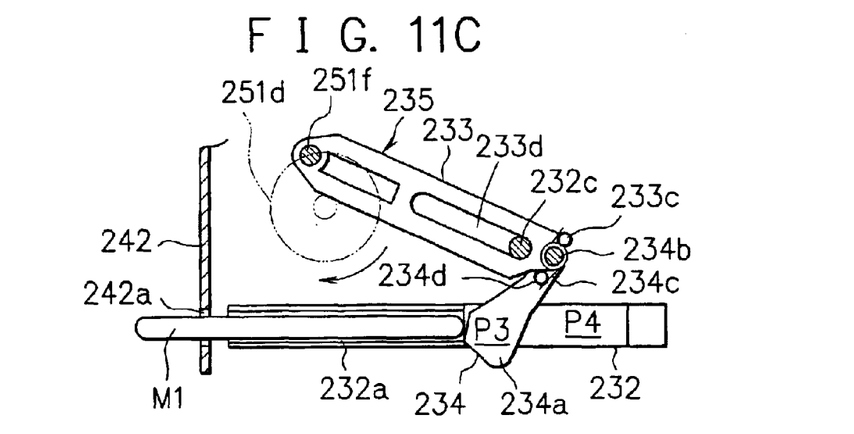
FIG. 11C is a plan sectional view showing that the muddler carrying-out element is moved to a carrying-out position.

Referring to FIGS. 3, 4, 11, and 12, the configuration of the muddler guiding part 232 will be discussed below. The muddler guiding part 232 has a muddler storing groove 232a which is extended in the longitudinal direction substantially from the center to the front end. When the muddlers M are carried out, as shown in FIGS. 11B, 11C, and 12B, the lowest muddler M1 is stored in the muddler storing groove 232a. During standby of carrying-out of muddlers, as shown in FIGS. 11A and 12A, the lowest muddler M1 is placed on a push-out plate 234a, which will be described later. Moreover, as shown in FIGS. 3 and 4, the side of the muddler guiding part 232 has a link receiving part 232b which is expanded inward. A rocking pin 232c protrudes from the link receiving part 232b. As shown in FIG. 3, the muddler guiding part 232 has the front side fastened with a screw N11 and the rear end fastened with the screw N10 on the chassis bottom plate 241. Further, when the muddler guiding part 232 is fixed on the chassis bottom plate 241, as shown in FIG. 11, the top end of the muddler storing groove 232a is opposed to a muddler takeout port 242a of the chassis bracket 242.

Figure 10:
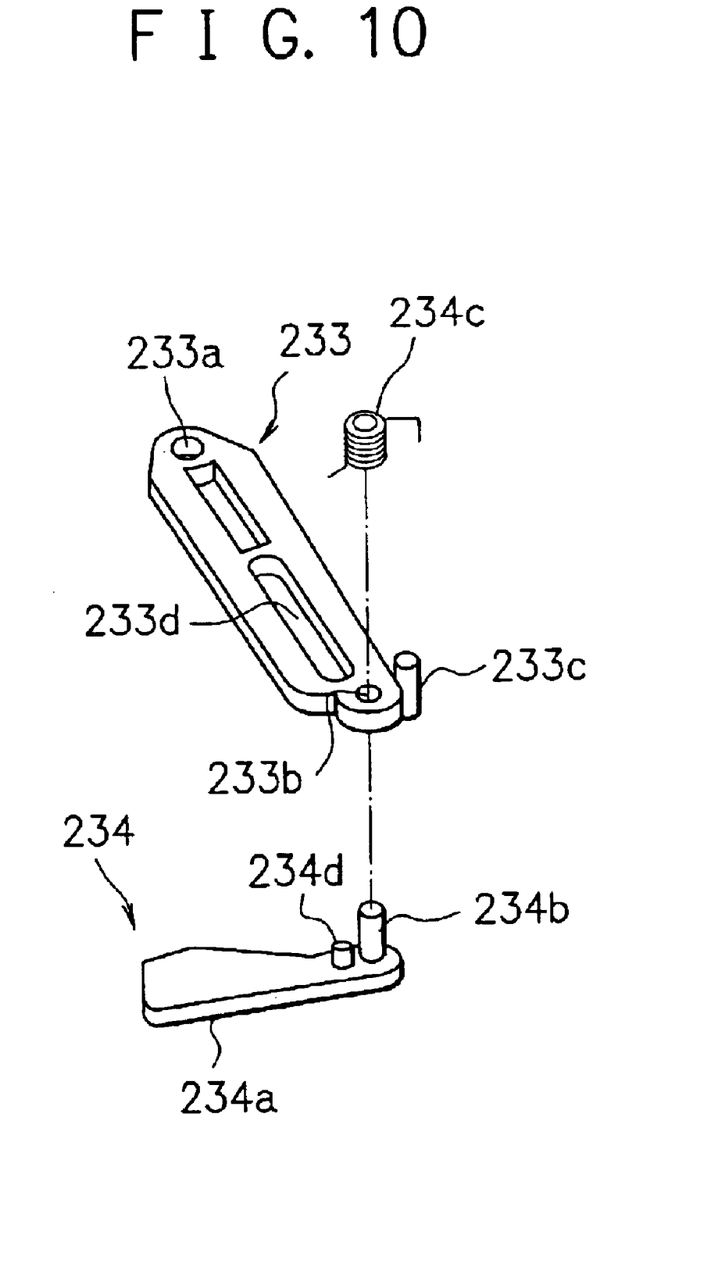
FIG. 10 is an exploded perspective view showing the muddler carrying-out device.

Referring to FIGS. 4, 10, and 11, the configuration of the rocking link 233 will be discussed below. The rocking link 233 is formed like a rectangular plate. A through hole 233a is formed on one end of the longitudinal direction of the rocking link 233. The output pin 251f connected to the rotating drum 251d is pivotally supported in the through hole 233a. With this arrangement, as shown in FIG. 11, the rocking link 233 is rocked by the rotation of the rotating drum 251d. Further, as shown in FIG. 10, on the other end of the longitudinal direction of the rocking link 233, a connecting hole 233b and a first spring engaging pin 233c are provided. As shown in FIG. 10, a connecting pin 234b of the muddler carrying-out element 234, which will be discussed later, is pivotally supported in the connecting hole 233b. A guiding oblong hole 233d is formed between the through hole 233a and the connecting hole 233b of the rocking link 233. As shown in FIG. 4, the rocking pin 232c of the muddler guiding part 232 penetrates the guiding oblong hole 233d.

Referring to FIGS. 4, 10, and 11, the configuration of the muddler carrying-out element 234 will be discussed below.

The muddler carrying-out element 234 has the push-out plate 234a formed so as to gradually increase in width from the base to the end. As shown in FIG. 10, the connecting pin 234b protrudes from the base of the push-out plate 234a. As described above, the connecting pin 234b penetrates the connecting hole 233b of the rocking link 233 so as to freely rotate. Further, a power transmitting member for transmitting rocking motion of the rocking link 233, for example, a coil spring 234c is wound around the connecting pin 234b. While one end of the coil spring 234c is engaged with the first spring engaging pin 233c, the other end of the coil spring 234c is engaged with a second spring engaging pin 234d which protrudes from the push-out plate 234a. Thus, the push-out plate 234a is pressed in the direction of carrying out the muddler M1 in FIG. 11. Besides, the coil spring 234c has strong spring force, and power from the rocking link 233 is transmitted to the push-out plate 234a without being degraded. By the rotation of the output pin 251f, the muddler carrying-out element 234 substantially performs rectilinear motion between a muddler carrying-out position P3 of FIGS. 11A and 11C and a muddler standby position P4 of FIG. 11B. As shown in FIG. 11C, a distance between the muddler carrying-out position P3 and the muddler standby position P4 is equal to a distance of protrusion made by a part of the lowest muddler M1 from the muddler takeout port 242a.

Figure 12A:
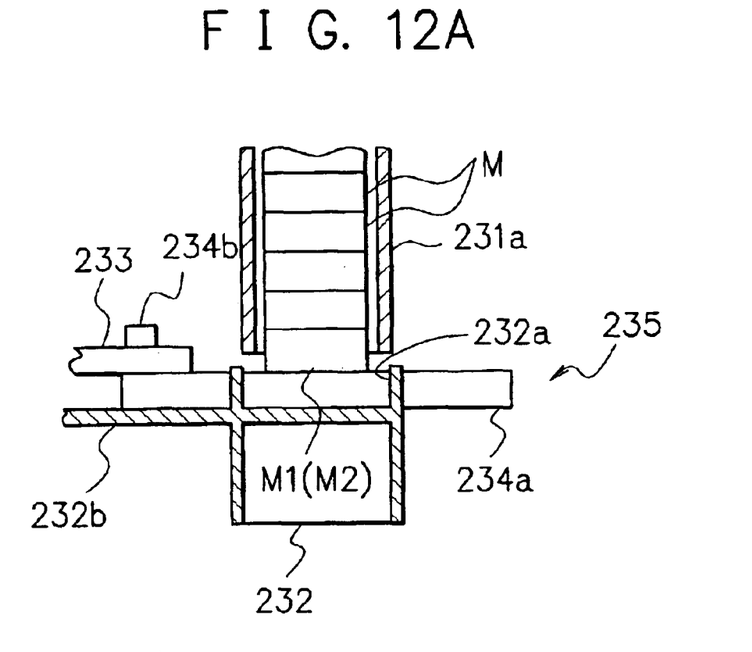
FIG. 12A is a front sectional view showing the standby state of the muddler carrying-out device.
Figure 12B:
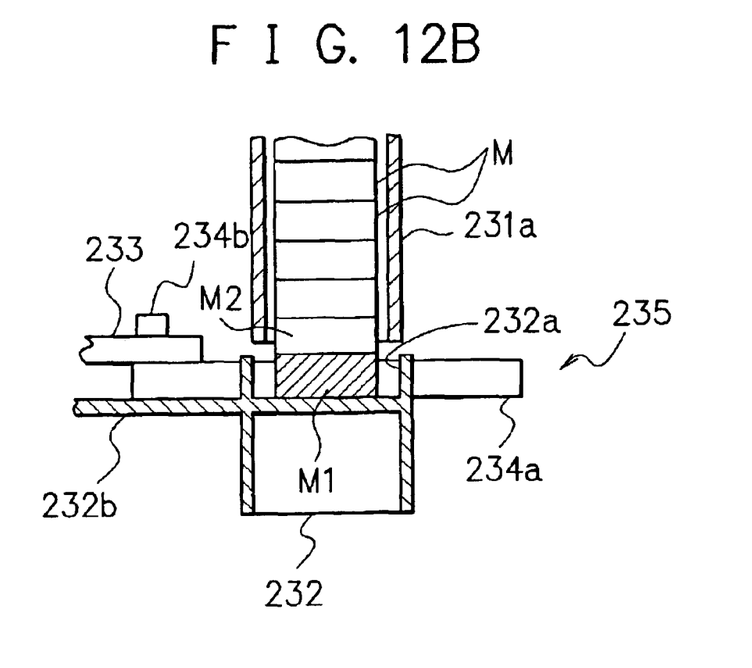
FIG. 12B is a front sectional view showing a state of carrying out muddlers in the muddler carrying-out device.

In the cup type coffee vending machine according to the present embodiment, when coins are dropped and an article is selected, the second driving motor 251 is driven with a predetermined rotation angle. Thus, as shown in FIG. 8, the holder 221 is rotated and moved from the cup selling position P2 to the cup receiving position P1. Next, the first driving motor 211 of the cup carrying-out device 21 is driven to drop the cup C, and the cup C is held by the holder 221. Further, the rocking link 233 of the muddler carrying-out device 23 is rocked from the state of FIG. 11A to the state of FIG. 11B, and the push-out plate 234a of the muddler carrying-out element 234 is moved to the muddler standby position P4. Hence, the lowest muddler M1 placed on the push-out plate 234a as shown in FIG. 12A is stored in the muddler storing groove 232a due to its own weight as shown in FIG. 12B. Thus, the rear end of the lowest muddler M1 and the push-out plate 234a are opposed to each other in the horizontal direction.

Thereafter, the second driving motor 251 is rotated and driven again. Hence, the holder 221 returns to the cup selling position P2. Then, coffee liquid, sugar, milk, and so on are poured into the cup C to prepare coffee in the cup C. Then, the cup with coffee is sold to a buyer. Moreover, in the muddler carrying-out device 23, the rocking link 233 is operated to return the push-out plate 234a to the muddler carrying-out position P3. The rear end of the lowest muddler M1 is brought into contact with the push-out plate 234a by the returning operation of the push-out plate 234a. Due to the pushing operation of the push-out plate 234a, as shown in FIG. 1C, the muddler M1 passes through the muddler takeout port 242a and a part near the top end of the muddler M1 protrudes out of the muddler takeout port 242a.

The buyer pulls out the protruding muddler M1 and can stir the coffee in the cup C by using the muddler M1. When the muddler M1 is left without being used, the lowest muddler M1 has already been moved by a distance of carrying out the muddler and the second lowest muddler M2 is supported by the lowest muddler M1. Thus, even when the second driving motor 251 is driven again thereafter, the carrying-out force of the muddler carrying-out element 234 is not applied to the lowest muddler M1 and the carrying-out force of the muddler carrying-out element 234 is not applied to the second lowest muddler M2. Therefore, when coffee is sold next time, although the push-out plate 234a is operated as shown in FIGS. 11A to 11C, the muddler carrying-out element 234 just performs reciprocating motion below the second lowest muddler M2 as shown in FIG. 12A as long as the muddler M1 is not pulled out.

According to the present embodiment, as described above, the cup holder mechanism 22 and the muddler carrying-out device 23 share the second driving motor 251 as a driving source. Thus, the cost of the driving source is equal to that of a single motor, and the installation space for the driving source is equal to that for a single motor. Therefore, the muddler carrying-out device 23 of the present embodiment can be mounted in a small vending machine.

Besides, when the muddlers M are carried out, the top end of the muddler M1 protrudes out of the muddler takeout port 242a, so that the muddler M1 is not completely dropped. When the previous buyer does not need the muddler M1, the protruding muddler M1 can be provided for the next buyer. Therefore, resource saving can be achieved.

Figure 13:
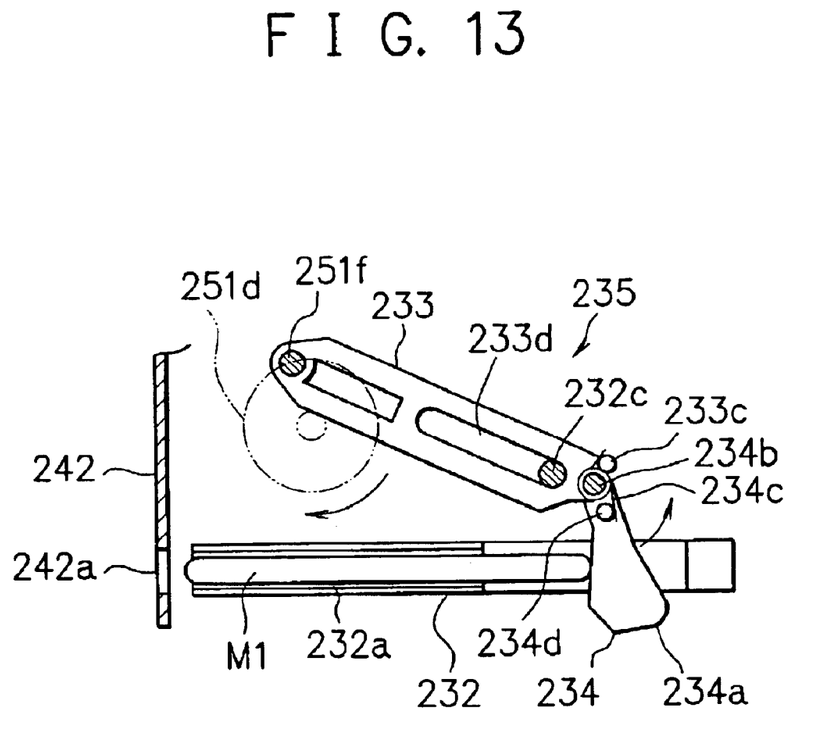
FIG. 13 is a plan sectional view showing an operation of the muddler carrying-out element when a muddler is clogged in the muddler carrying-out device.

Furthermore, when the muddler carrying-out device 23 has a problem such as clogging of a muddler, the driving force of the motor may be applied to the muddler carrying-out device 23 as an overload. However, since the coil spring 234c of the muddler carrying-out element 234 is elastically deformed to absorb the overload, the muddler carrying-out device 23 is not damaged. Referring to FIG. 13, this effect will be described below. It is understood from FIG. 13 that when the rocking link 233 returns, in the case of the lowest muddler M1 firmly bonded to the muddler storing groove 232a, the coil spring 234c is elastically deformed to perform absorption.

Additionally, in the above embodiment, in the muddler carrying-out device 23, the push-out plate 234a performs reciprocating motion from the state of FIG. 11A to the state of 11B and to the state of FIG. 11C (P3→P4→P3). The motion is not limited to the above reciprocating motion. Namely, when the initial position of the rocking link 233 is set at the state of FIG. 11B, the push-out plate 234a performs reciprocating motion of P4→P3→P4. It is needless to say that such a reciprocating motion can also carry out the muddlers M one by one.

FIGS. 14 to 18 show an embodiment in which a shutter mechanism 26 is provided on the muddler storing part 231. The same constituent elements as those of the above embodiment are indicated by the same reference numerals.

Figure 14:
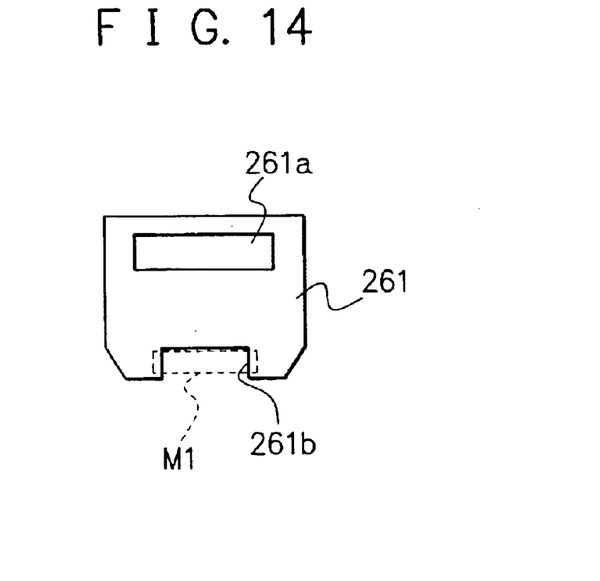
FIG. 14 is a front view showing a shutter plate.

The shutter mechanism 26 is installed on a lower part of the top end of a muddler storing plate 231a. The shutter mechanism 26 is constituted by a shutter plate 261 and a supporting plate 262. As shown in FIG. 14, while a rectangular hanging hole 261a is formed on the upper part of the shutter plate 261, a rectangular notch 261b is formed on the lower part of the shutter plate 261. Further, the notch 261b is slightly smaller in width than the muddler M (the shape taken from the top end of the muddler M is indicated by a broken line of FIG. 14).

Figure 15A:
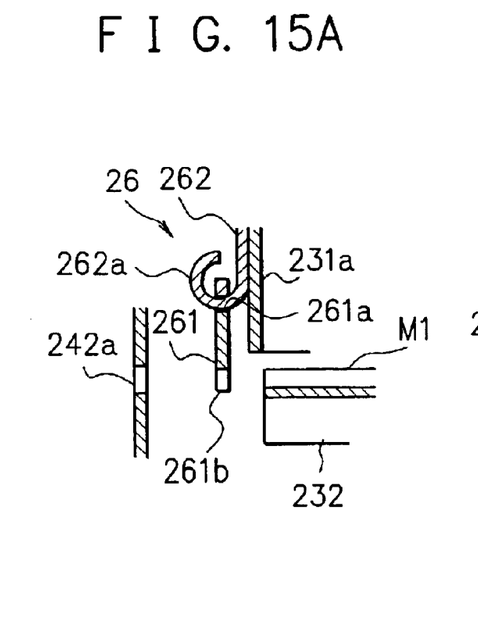
FIG. 15A is a side sectional view showing a shutter mechanism when the muddler carrying-out device is on standby.
Figure 15B:
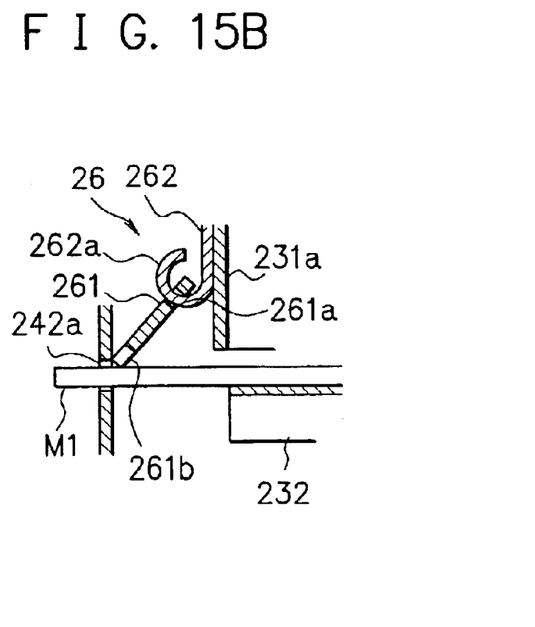
FIG. 15B is a side sectional view showing the shutter mechanism when the muddler carrying-out device carries out a muddler.

On the other hand, as shown in FIG. 15, the supporting plate 262 is fixed on the front surface of the muddler storing plate 231a and the lower part of the supporting plate 262 is curled. Moreover, the hanging hole 261a of the shutter plate 261 passes through the curling part 262a and the shutter plate 261 is suspended so as to freely rotate.

As shown in FIG. 15A, when the muddlers M are completely stored in the muddler storing part 231 (when the lowest muddler M1 is on standby), the shutter plate 261 is vertically suspended, and a foreign matter (foreign matter H having the same shape as the muddler M1) is prevented from entering from the outside of a muddler takeout port 242a. Further, as shown in FIG. 15B, when the muddler M1 is pushed out to the muddler takeout port 242a (when the muddler M1 is carried out), the shutter plate 261 is pushed by the muddler M1 and is rotated. Thereafter, the lower end of the shutter plate 261 is placed on the upper surface of the muddler M1.

Figure 16A:
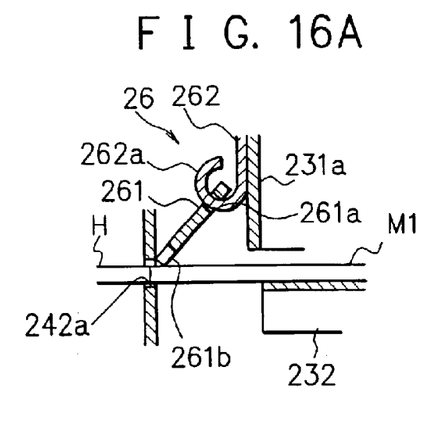
FIG. 16A is a vertical sectional view showing a first step of reversely inserting a foreign matter.
Figure 16B:
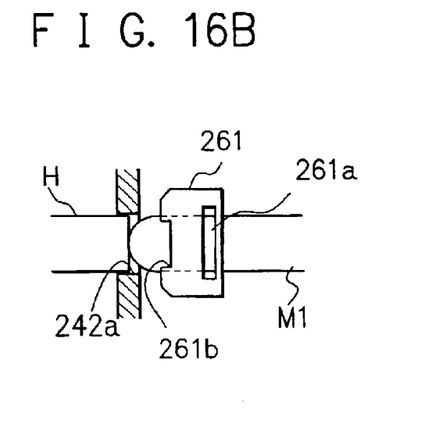
FIG. 16B is a plan sectional view showing the first step of reversely inserting the foreign matter.
Figure 17A:
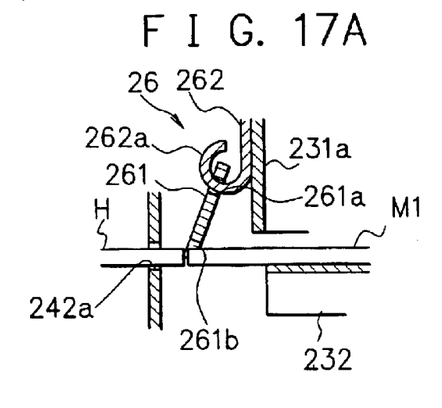
FIG. 17A is a vertical sectional view showing a second step of reversely inserting the foreign matter.
Figure 17B:
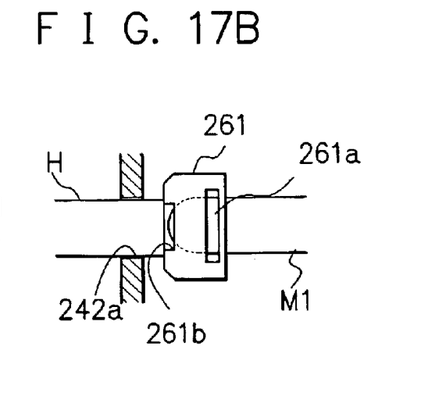
FIG. 17B is a plan sectional view showing the second step of reversely inserting the foreign matter.
Figure 18A:
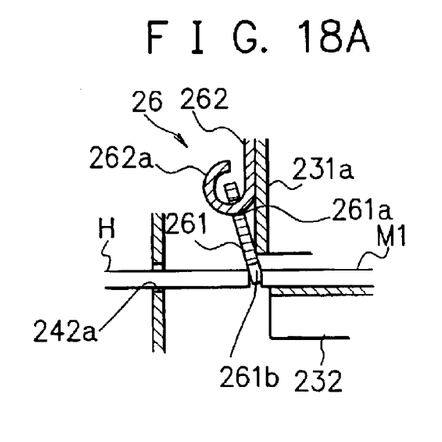
FIG. 18A is a vertical sectional view showing a third step of reversely inserting the foreign matter.
Figure 18B:
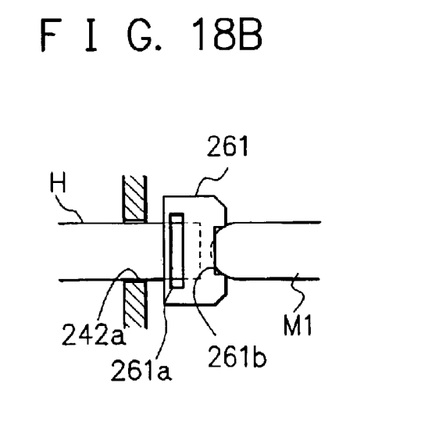
FIG. 18B is a plan sectional view showing the third step of reversely inserting the foreign matter.

In the state of carrying out the muddler M1 as shown in FIG. 15B, when the foreign matter H is reversely inserted from the outside of the muddler takeout port 242a, the shutter plate 261 operates as shown in FIGS. 16 to 18.

Namely, as shown in FIGS. 16A and 16B, at the initial stage where the muddler M1 protruding from the muddler takeout port 242a is pushed back by the foreign matter H, the top end of the foreign matter H and the top end of the muddler M1 are in contact with each other. As shown in FIGS. 17A and 17B, when the foreign matter H is further pushed inward, the round end of the muddler M1 is fit into a notch 261b. Moreover, the top end of the foreign matter H is brought into contact with the lower end of the shutter plate 261 and is separated from the top end of the muddler M1. Namely, the foreign matter H is interrupted by the shutter plate 261. Then, as shown in FIGS. 18A and 18B, even when the foreign matter H is further pushed inward, the foreign matter H is interrupted by the shutter plate 261 and does not enter the muddler storing part 231.

The above embodiment described the example using a so-called link mechanism as a power transmitting member of the muddler carrying-out device 23. The configuration is not limited as long as rotation driving force of the second driving motor 251 can be transmitted. For example, the muddlers M can be carried out by using a belt carrying-out mechanism.

What is claimed is:

1. A muddler carrying-out device, comprising:
   a muddler storing part for storing a plurality of stacked muddlers, and
   a muddler carrying-out part for carrying out the lowest muddler of the plurality of muddlers stored in the muddler storing part to a muddler takeout port,
   wherein a distance of carrying out the muddler in the muddler carrying-out part is set at a distance of protruding a part of the lowest muddler from the muddler takeout port.

2. The muddler carrying-out device according to claim 1, wherein the muddler carrying-out part comprises:
   a muddler guiding part for guiding the lowest muddler stored in the muddler storing part to the muddler takeout port,
   a muddler carrying-out element which can move between a muddler standby position and a muddler carrying-out position of the muddler guiding part and can push a rear end of the lowest muddler in a direction of carrying out the muddler, and
   a rocking link which is connected to the muddler carrying-out element and a rotary driving motor, converts rotating movement of the rotary driving motor substantially to rectilinear motion, and causes the muddler carrying-out element to reciprocate between the muddler standby position and the muddler carrying-out position.

3. The muddler carrying-out device according to claim 2, wherein the muddler carrying-out element is pivotally supported by the rocking link, and an elastic force is applied to the muddler carrying-out element by a spring means in the direction of carrying out the muddler.

4. The muddler carrying-out device according to claim 2, wherein the rotary driving motor is also a rotary driving source for driving a cup holder mechanism of a vending machine.

5. The muddler carrying-out device according to claim 3, wherein the rotary driving motor is shared with a rotary driving source for driving a cup holder mechanism of a vending machine.

6. The muddler carrying-out device according to claim 1, further comprising a shutter mechanism for restraining entry of a member inserted from an outside to an inside of the muddler takeout port.

7. The muddler carrying-out device according to claim 2, further comprising a shutter mechanism for restraining entry of a member inserted from an outside to an inside of the muddler takeout port.

8. The muddler carrying-out device according to claim 3, further comprising a shutter mechanism for restraining entry of a member inserted from an outside to an inside of the muddler takeout port.

9. The muddler carrying-out device according to claim 4, further comprising a shutter mechanism for restraining entry of a member inserted from an outside to an inside of the muddler takeout port.

10. The muddler carrying-out device according to claim 5, further comprising a shutter mechanism for restraining entry of a member inserted from an outside to an inside of the muddler takeout port.

* * * * *